US007124578B2

(12) United States Patent
Noel

(10) Patent No.: US 7,124,578 B2
(45) Date of Patent: Oct. 24, 2006

(54) MONITORING VALVE, ROCK DRILLING APPARATUS AND A METHOD FOR CONTROLLING AT LEAST TWO HYDRAULIC ACTUATORS TO SUCH A MONITORING VALVE AND ROCK DRILLING APPARATUS

(75) Inventor: Roger Noel, Bron (FR)

(73) Assignee: Sandvik Tamrock OY, Tampere (FI)

( * ) Notice: Subject to any disclaimer, the term of this patent is extended or adjusted under 35 U.S.C. 154(b) by 0 days.

(21) Appl. No.: 10/533,884

(22) PCT Filed: Nov. 5, 2003

(86) PCT No.: PCT/FI03/00823

§ 371 (c)(1), (2), (4) Date: May 5, 2005

(87) PCT Pub. No.: WO2004/042192

PCT Pub. Date: May 21, 2004

(65) Prior Publication Data

US 2006/0011360 A1 Jan. 19, 2006

(30) Foreign Application Priority Data

Nov. 5, 2002 (FI) .................................. 20021980

(51) Int. Cl.
*F16D 31/02* (2006.01)

(52) U.S. Cl. ........................................... 60/468; 60/422

(58) Field of Classification Search .................. 60/422, 60/468; 91/446, 447
See application file for complete search history.

(56) References Cited

U.S. PATENT DOCUMENTS

| | | | |
|---|---|---|---|
| 3,561,542 | A | 2/1971 | Hanson et al. |
| 3,823,729 | A | 7/1974 | Swogger |
| 4,431,020 | A | 2/1984 | Kowalski |
| 4,711,090 | A | 12/1987 | Hartiala et al. |
| 4,967,791 | A | 11/1990 | Sternberger |
| 5,347,811 | A | 9/1994 | Hasegawa et al. |
| 5,771,981 | A | 6/1998 | Briggs et al. |
| 5,778,990 | A | 7/1998 | Niemi |
| 5,826,613 | A | 10/1998 | Schalk |
| 6,176,324 | B1 | 1/2001 | Cadet |
| 6,408,622 | B1 | 6/2002 | Tsuruga et al. |

FOREIGN PATENT DOCUMENTS

EP 1 146 267 A1 10/2001

OTHER PUBLICATIONS

Official Action issued in the Finnish Priority Application No. 20021980.

*Primary Examiner*—Edward K. Look
*Assistant Examiner*—Michael Leslie
(74) *Attorney, Agent, or Firm*—Drinker Biddle & Reath LLP

(57) ABSTRACT

The invention relates to a method for controlling at least two hydraulic actuators, to a monitoring valve and a rock drilling apparatus. The monitoring valve (10) is connected to the input channel of a first actuator through a sensing channel (9) and controls a load-sense circuit (6') of a second actuator. The pressure of the load-sense circuit (6') is set by a force of a spring element (12) and biased by a control element (42) of the monitoring valve with differential pressure sensing.

17 Claims, 9 Drawing Sheets

MONITORING VALVE, ROCK DRILLING APPARATUS AND A METHOD FOR CONTROLLING AT LEAST TWO HYDRAULIC ACTUATORS TO SUCH A MONITORING VALVE AND ROCK DRILLING APPARATUS

FIELD OF THE INVENTION

The invention relates to what is stated in the preambles of the independent claims of the application.

BACKGROUND OF THE INVENTION

Load-sense circuits and valves are used more and more in hydraulic systems. Valves of this kind can be used in situations in which only one hydraulic pump provides the necessary flow and pressure to a hydraulic circuit having several actuators connected to it. With the load-sense valves, it is possible to control each of the actuators individually. The maximum pressure of the actuators can be controlled via pilot relief valves limiting the pressure of the load-sense lines.

In the case of two different actuators to be related by a pressure relation, a first actuator pressure can control a second actuator pressure in using a monitoring valve. The monitoring valve senses the pressure of first actuator and defines the load-sense pressure of the second actuator. Unfortunately, most monitoring valves induce unacceptable leaks from second circuit into the first circuit, and thus modify the first actuator's flow control. They also show high hysteresis, which is why their use in controlling pressures is difficult.

BRIEF DESCRIPTION OF THE INVENTION

It is an object of the present invention to provide a novel and improved valve and control system for controlling pressure medium operated actuators. A further object is to provide a novel and improved method for controlling rock drilling.

The method of the invention is characterized in that a reference pressure led to a monitoring valve is controlled to define a specific pressure level of a first actuator, above which level the pressure ratio control is active.

The valve of the invention is characterized in that its slide has at least one collar, that a sleeve is arranged around the slide, that the body has a space inside which the collar and the sleeve are arranged to move, that the outer rim of the sleeve is sealed to the body and the inner rim of the sleeve is sealed to the slide, that the sleeve defines a first chamber and a second chamber on opposite sides of the sleeve, and said chambers are not connected to each other, that the first chamber is connected at least to a first pressure channel and the second chamber is connected at least to a second pressure channel, that the sleeve is arranged to move in the first or the second direction of travel depending on the pressure difference inside the chambers, and that in one direction of travel, the sleeve is arranged to act on the axial position of the slide when abutting on the collar.

The rock drilling apparatus of the invention is characterized in that a reference pressure channel is connected to a monitoring valve and the control of the reference, pressure is arranged to define a specific pressure level of feed apparatus, above which level the feed apparatus pressure activates pressure ratio control on the percussion apparatus.

The essential idea of the invention is that hydraulic power is provided to a hydraulic circuit by using at least one pump and the hydraulic flow and pressure is led in a desired manner to at least two hydraulically operated actuators, namely a first actuator and a second actuator, connected to the hydraulic circuit.

Both actuators are provided with at least one pressure fluid channel, and at least one fluid channel may be equipped with a compensator valve to control the effective flows and pressures in the actuators. The monitoring valve is connected to the input channel of a first actuator through a sensing channel and controls a load-sense circuit of a second actuator. The pressure of the load-sense circuit is set by a force of a spring element and biased by a control element of the monitoring valve with differential pressure sensing.

The invention provides the advantage that the pressure relation between two actuators of the system can now be adjusted in a more versatile and accurate manner. A further advantage of the monitoring valve of the invention is its simple hydraulic-mechanical structure that does not necessarily need electrical components. The monitoring valve can thus be an inexpensive and reliable component.

In a rock drilling apparatus, it is possible to use the monitoring valve to adjust an appropriate low limit for percussion pressure, sense the pressure of drill feed and vary the percussion pressure in proportion to the feed pressure variations. With a specific connection based on two relief valves in series, it is possible to fine adjust the feed pressure while keeping the percussion pressure unchanged.

BRIEF DESCRIPTION OF THE FIGURES

The invention is described in greater detail in the attached drawings, in which.

In the figures, the invention is shown in a simplified manner for the sake of clarity. Similar parts are marked in different figures with the same reference numerals.

DETAILED DESCRIPTION OF THE INVENTION

Figure 1:
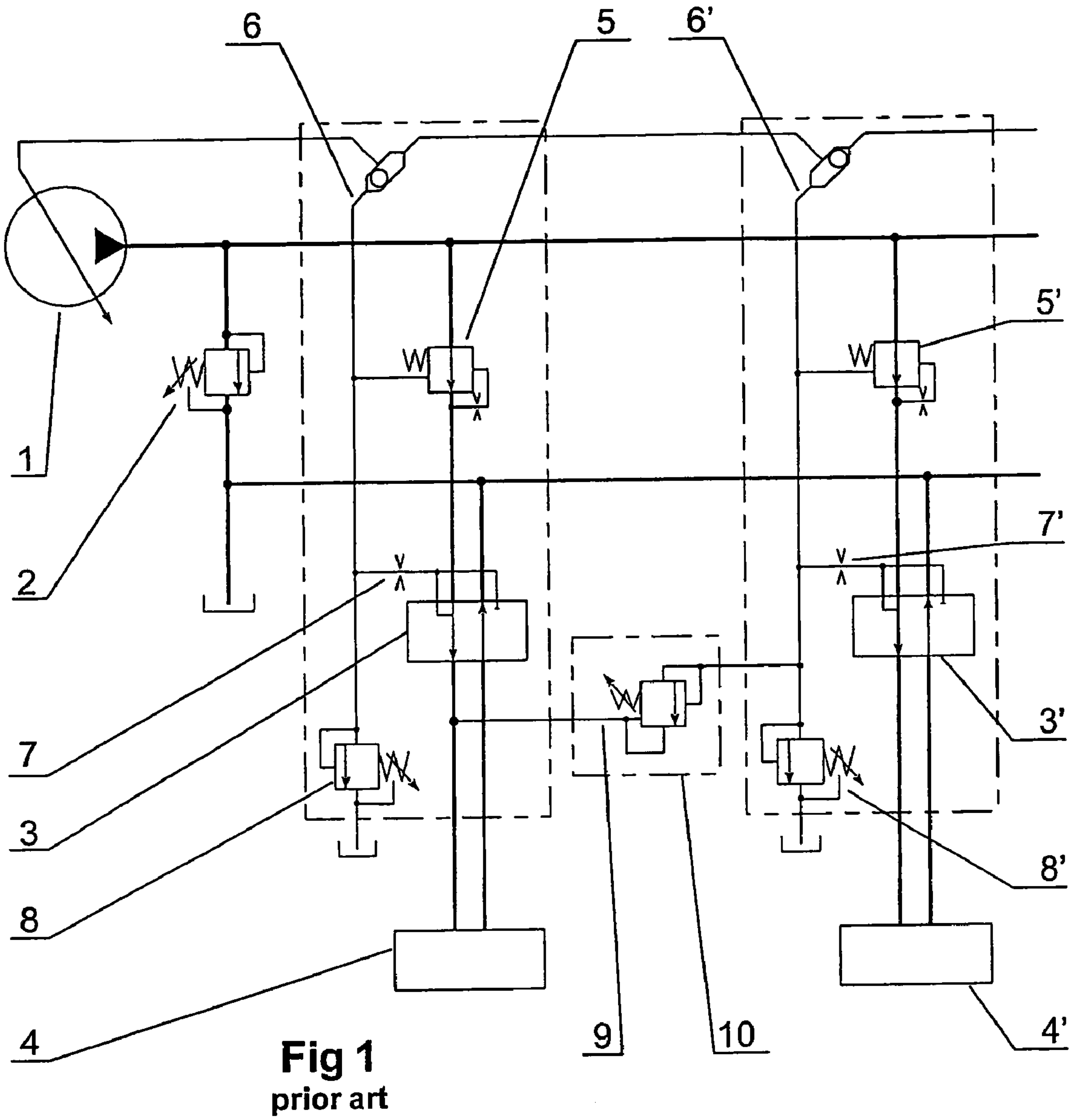
Fig 1 prior art
FIG. 1 is a schematic view of a prior art pressure medium circuit.

The hydraulic circuit shown in FIG. 1 comprises at least one pump that can be a fixed displacement pump or an adjustable displacement pump. A fixed displacement pump provides a constant volume flow. The pressure and flow fed into the hydraulic circuit are controlled by directing, when necessary, part of the flow provided by the pump to a tank through a three way compensator valve (not shown).

FIG. 1 specifically shows an adjustable displacement pump 1 with integrated load-sense control elements to control the flow and pressure provided by the pump. The control elements can be pressure-operated, for instance. A pressure relief valve 2 can be arranged to the channel coming from the pump 1 to open a connection to the tank if the pressure from the pump 1 exceeds a predefined value. In this way, it is possible to avoid possible pressure shocks.

At least two actuators 4, 4' are connected to the hydraulic circuit, to which the hydraulic flow produced by the pump 1 is led through control spools 3, 3'. The control spools 3, 3' can be actuated manually, hydraulically or electrically. For sake of clarity, both spools 3, 3' are shown in their activated position. Further, at least one compensator valve 5, (5') in the channels leading to the actuators 4, (4') adjusts the hydraulic flow/pressure led to the actuators 4, (4'). Load-sense circuits 6, 6' sense via the control spools 3, 3' and the restrictors 7, 7' the pressure in the feeding lines of actuators 4, 4'. The load-sense circuits 6, 6' are further connected to the compensator valves 5, 5' and control the adjustable displacement pump. The load-sense circuits 6, 6' can also contain pressure relief valves 8, 8'.

Figure 1A:
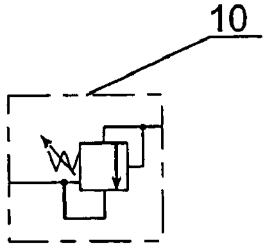
Fig 1A prior art
FIGS. 1A, 1B and 1C are schematic views of a prior art monitoring valves.
Figure 1B:
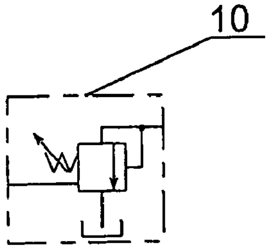
Fig 1B prior art
Figure 1C:
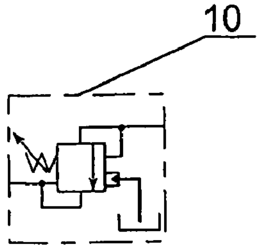
Fig 1C prior art

In FIG. 1, the input channel leading to the first actuator 4 is connected to a monitoring valve 10 via a sensing channel 9. The monitoring valve 10 is further connected to the load-sense circuit 6' of the second actuator 4'. FIGS. 1A, 1B, 1C show possible existing monitoring valves, respectively relief, sequence and counterbalance valves, with various drawbacks to be overcome by the valve of the invention.

Figure 2:
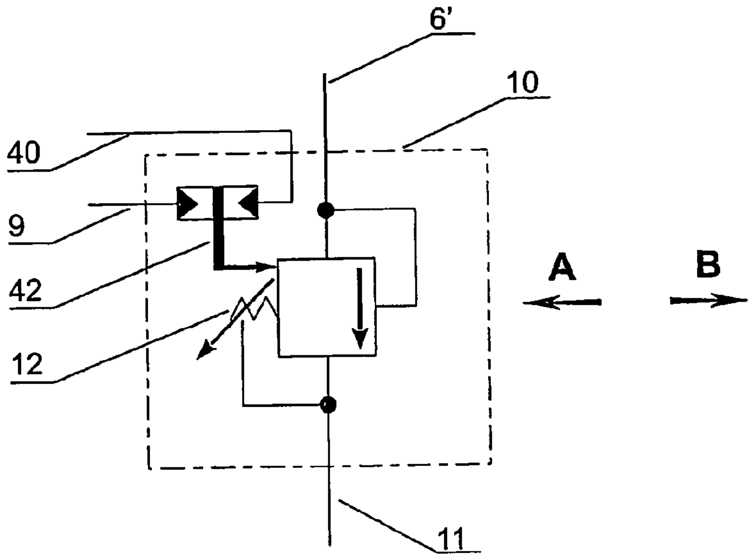
FIG. 2 is a schematic view of a monitoring valve of the invention.

FIG. 2 shows a monitoring valve 10 of the invention and its connections to a hydraulic circuit. The monitoring valve 10 can be a hydraulic valve having a basic structure similar to a pressure relief valve. The monitoring valve 10 is connected to the load-sense circuit 6' of the second actuator 4' and to the input channel of the first actuator 4 through the sensing channel 9. If the pressure of the load-sense circuit 6' exceeds a preset limit value, it provides a force that exceeds a pre-set counter force, for instance a force produced with a spring 12, and moves the spool towards direction A, thus opening a connection from the load-sense circuit 6' to a discharge channel 11. Further, the valve has a control element 42 arranged to influence the opening of the connection between the load-sense circuit 6' and discharge channel 11. The effective pressure of the sensing channel 9 and the hydraulic pressure of a reference channel 40 are arranged to act on the control element 42. When the pressure of the sensing channel 9 is higher than the pressure of the reference channel 40, the control element 42 adds its force to the force of the spring 12 to prevent the opening of the connection to the discharge channel, as a result of which the pressure in the load-sense circuit 6' will increase.

Figure 3:
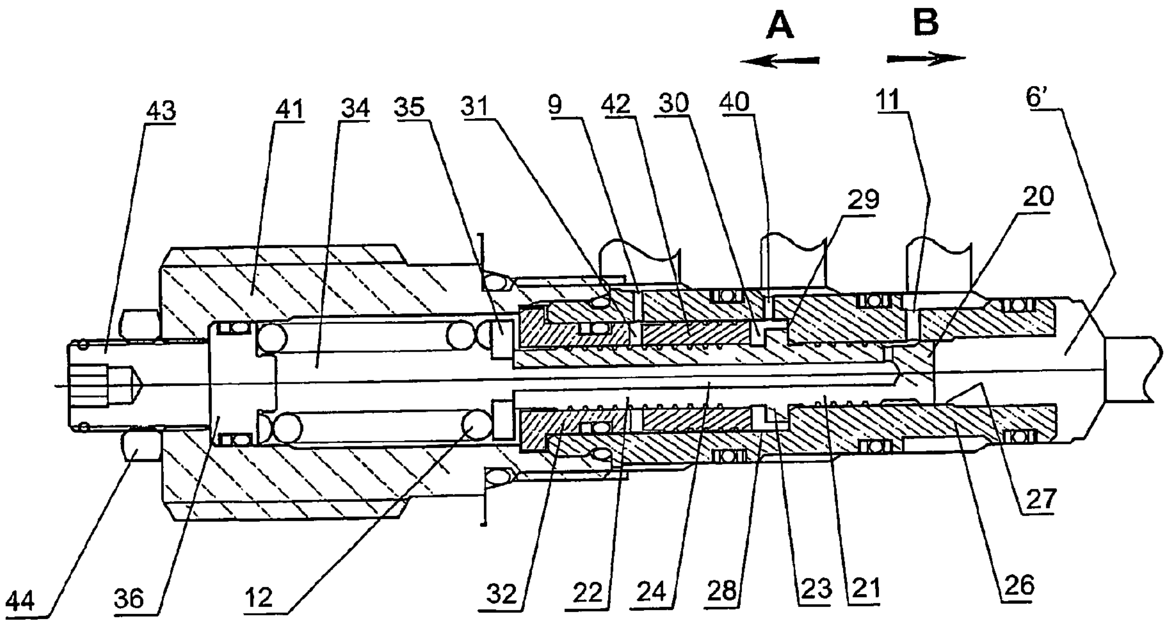
FIG. 3 is a sectional side view of a construction of a monitoring valve of the invention.

FIG. 3 shows a construction of a monitoring valve 10 of the invention. The valve can be a spool valve comprising a body 26 and an elongated slide 20 arranged in a space in the body 26. The cross-profile of the slide 20 can be substantially round and the slide has a first end and a second end, the diameters of which may be substantially equal. The first end of the slide 20 is sealed substantially pressure-tight with respect to the body 26 by means of a detachable support sleeve 32, for instance. The second end of the slide 20 is on its outer rim sealed to a bore 27 in the body 26. A pressure space 28 may be formed between the sealed ends in the body 26.

Further, the mid-section of the slide 20 may comprise a collar 23 arranged to said pressure space 28. The diameter of the collar 23 is bigger than the diameter of the first and second ends of the slide. On the other hand, the diameter of the collar 23 is smaller than that of the pressure space 28 so that the collar 23 does not touch the walls of the pressure space 28. For this reason, the collar 23 does not restrict the flow of pressure fluid in the pressure space 28. The movement of the slide 20 is restricted towards direction B in such a manner that the collar is arranged to settle against the end surface 29 of the pressure space 28 when the slide 20 is in its extreme right position in FIG. 3. Further, an elongated sleeve 42, previously designated as control element in FIG. 2, is arranged around the slide 20. The sleeve 42 is axially movable in the pressure space 28. The inner rim of the sleeve 42 is sealed to the slide 20, at first end side. The sleeve 42 can thus move axially independently from the slide 20. The outer rim of the sleeve 42 is sealed to the body 26. A front chamber 31 is then located on the first end side of the sleeve 42 and a rear chamber 30 is on the second end side. Due to the sealing, the chambers 31, 30 are not connected to each other. Further, hydraulic channels 9, 40 lead to the pressure space 28. The front chamber 31 is connected to the sensing channel 9 and the rear chamber 30 is connected to the reference channel 40.

On the first end side of the slide 20, the rear body 41 forms a chamber 34, to which a spring 12 can be arranged that can be a compression spring or any other spring element or force element enabling a corresponding action. The first end of the slide 20 and the spring. 12 can be either in direct contact with each other or they may have a shim or some other connecting element 35 between them. The monitoring valve further comprises a control element 36 to control the force of the spring 12. The control element 36 is positioned by an adjusting screw 43 for compressing, i.e. pretensioning, the spring 12, and a locking nut 44 for locking the adjusting screw 43 to a desired position. In the situation of FIG. 3, the spring 12 has pushed the slide 20 in direction B to its extreme rightmost position, i.e. so that the collar 23 is against the end surface 29 of the pressure space 28.

As FIG. 3 further shows, the end surface of the second end of the slide 20 is connected to the channel leading to the load-sense circuit 6'. Further, the bore 27, to which the second end of the slide 20 is sealed, has a connection to the discharge channel 11. The slide 20 can also have a longitudinal channel 24 that connects the chamber 34 to the discharge channel 11. Possible leak flows can flow along the channel 24 to the tank.

The monitoring valve 10 shown in FIG. 3 operates like a pressure-relief valve. When the pressure of the load-sense circuit 6' pushes the slide 20 to direction A, the connection between the discharge channel 11 and load-sense circuit 6' opens. The higher the force that prevents the slide 20 from moving towards direction A to open the connection to the discharge channel 11, the higher the pressure formed in the load-sense circuit 6'. The effective pressures of the chambers 30, 31 do not directly affect the position of the slide 20, they only affect the position of the sleeve 42. The sleeve 42 in turn affects the position of the slide 20. The sleeve 42 has two substantially equal pressure surfaces towards the rear chamber 31 and the front chamber 30. If the pressure in the sensing channel 9 is lower than that of the reference channel 40, the sleeve 42 moves towards direction A against the support sleeve 32. If the pressure in the sensing channel 9 is higher than that of the reference channel 40, the sleeve 42 moves to abut against the collar 23 of the slide 20. The force pushing the sleeve 42 towards direction B then together with the force of the spring 12 tries to prevent the slide 20 from moving towards direction A. Because the slide 20 opposes the opening of the connection to the discharge channel 11, the load-sense circuit 6' will have a higher effective pressure.

The ratio of the effective pressure variations in the sensing channel 9 and load-sense circuit 6' remains constant. The magnitude of the pressure ratio depends on the internal structure of the monitoring valve 10, i.e. in this case on the ratio of the end surface area of the second end of the slide 20, and the end surface area of the sleeve 42. In the monitoring valve 10, the pressure ratio can be formed with quite a high range, for instance 1:3 . . . 3:1. By changing the dimensions of the bores 28 and 27, it is possible to form monitoring valves having different pressure ratios. The pressure ratio of the monitoring valve is defined as the ratio between the above-mentioned active surfaces. By mounting a monitoring valve with a different pressure ratio in the hydraulic system, it is possible to change the ratio control of a first actuator on a second actuator.

An advantage of the construction shown in FIG. 3 is that the slide 20 provides an accurate pressure value to the load-sense circuit 6' because of the cylindrical mounting and cylindrical sealing between the slide 20 and its bore 27. In prior art valves, so called “ball and seat” or “poppet and seat” type constructions (as commonly utilised in overcenter valves for example) would create harmful hysteresis. Another reason for hysteresis in prior art overcenter valves are the many dynamic seals mounted on pistons and slides. For this specific reason, in the present invention, the spool 20 and control element 13 are designed without any inner or outer seal. The leaks from one chamber to the other are limited by a low clearance between moving parts and bores.

Because the load-sense circuit 6' is arranged to flow into the discharge channel 11, no pressure fluid can flow from the load-sense circuit 6' to the chamber 30 or to the chamber 31 located further away at the mid-section of the slide 20. Thus, hydraulic channels connected to chambers 30 or 31 are not disturbed by the variable load-sense flow from circuit 6'. Chambers 30 and 31 can be considered substantially leak-free. Only tiny leaks controlled by the clearances between moving parts 20, 42 and bores 27, 28 may occur.

It should be noted that the detailed structure of the monitoring valve 10 could differ from the construction shown in FIG. 3. A person skilled in the art can also construct in other ways a monitoring valve according to the principle of the invention. Thus, the shape of the slide 20, the location of the channels 9, 40, 11, 6' and the force element 12 can be constructed in another manner than shown in the figures. It is for instance possible to use another force element than a spring, such as a pressure accumulator or an electric actuator, to preset the monitoring valve 10.

Figure 4:
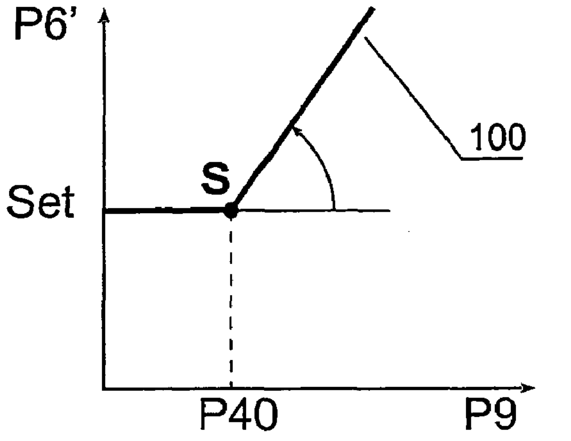
FIGS. 4, 5A and 5B are schematic views of the operating principles of a monitoring valve of the invention.
Figure 5A:
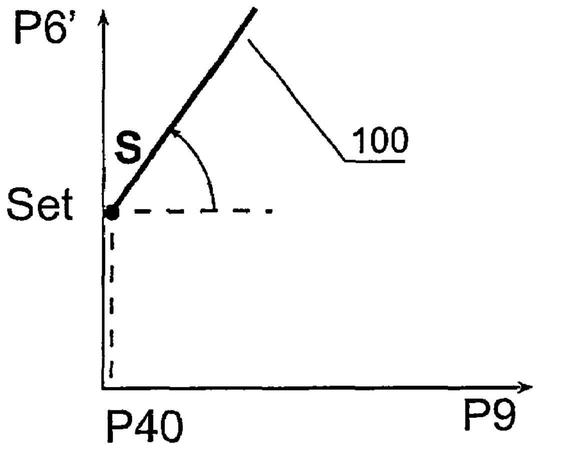
Figure 5B:
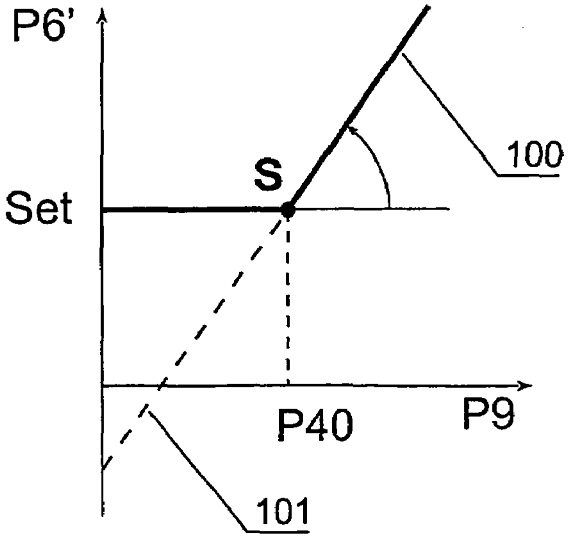

FIGS. 4, 5A and 5B show by means of curve 100 the pressure relation induced via monitoring valve 10 to the load-sense circuit 6' by a pressure sensed in the sensing channel 9. The pressure of the sensing channel 9 is shown on the horizontal axis and the pressure of the load-sense circuit 6' is shown on the vertical axis. By adjusting the force of the spring 12, the minimum load-sense pressure, i.e. the horizontal portion of the curve 100 is set. The point where curve 100 changes from a constant pressure curve to a pressure ratio curve is marked with S in the figures. This point S shows the situation, where the sleeve 42 of the monitoring valve 10 begins to affect the pressure of the load-sense circuit 6'. The location of point S depends on how high the pressure in the reference channel 40 is. In FIG. 5A, the pressure of the reference channel 40 is zero, so-point S is on the vertical axis, and the corresponding curve can only cut the vertical axis at positive values. When the pressure of the reference channel 40 is high enough, as in FIG. 5B, the dashed-line continuation 101 of the curve can cut the vertical axis at negative values. When a monitoring valve 10 of the invention is used, the location of the point S can be freely selected by adjusting the pressure-of the reference channel 40, whereas the location of point S is strictly limited in prior-art valves to the position of FIG. 5A.

Figure 6A:
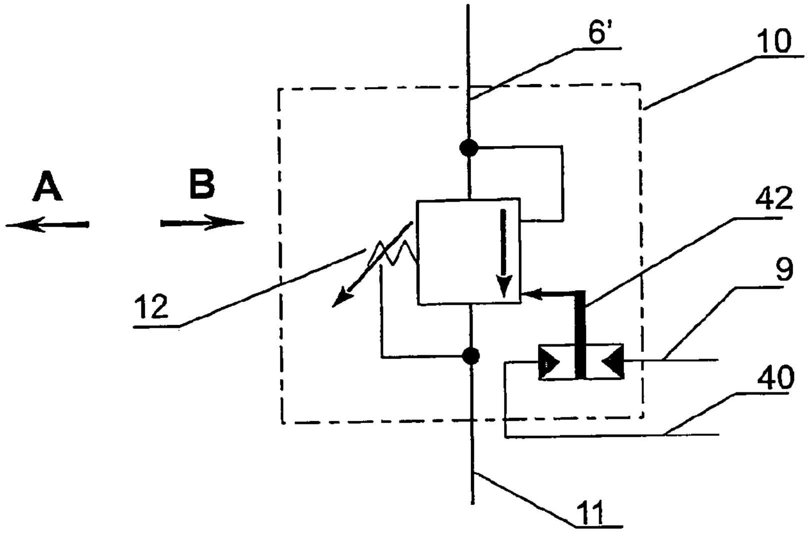
FIG. 6A is a schematic view and FIG. 6B shows the operating principle of a second embodiment of the valve of the invention.
Figure 6:
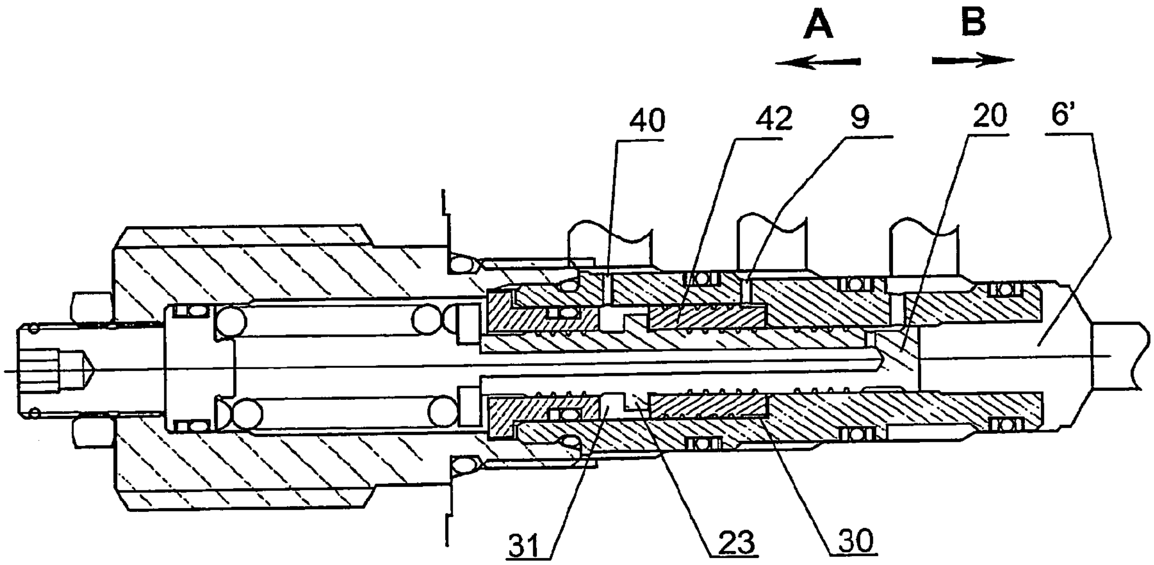
FIG. 6 is a sectional side view.

FIG. 6 shows another construction of a monitoring valve 10 of the invention, and FIG. 6A shows the according hydraulic graphical symbol.

Differing from FIG. 3, the monitoring valve 10 can be constructed in such a manner that the collar 23 of slide 20 is arranged to move in the front chamber 31 instead of the rear chamber 30. In comparison with the situation in FIG. 3, the sleeve 42 works by pushing the slide 20 to the opposite direction. In addition, the positions of the reference channel 40 and sensing channel 9 are reversed. When the pressure of the sensing channel 9 increases above the pressure of the reference channel 40, the sleeve 42 begins to reduce the force provided by the spring 12.

Figure 6B:
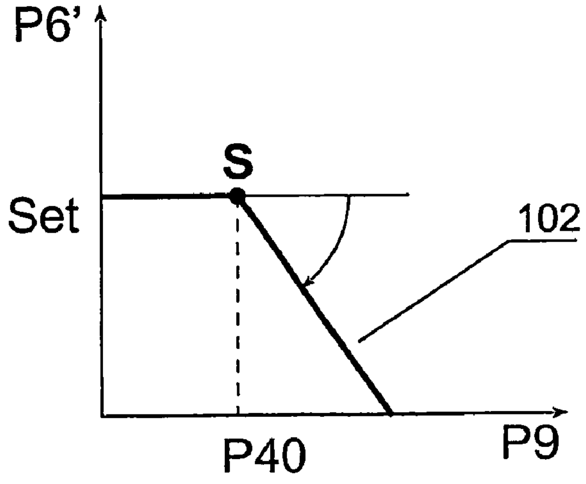

FIG. 6B shows by means of curve 102 the pressure relation induced via monitoring valve 10 in the load-sense circuit 6' by a pressure sensed in sensing channel 9. This is shown in FIG. 6B by marking point S, where curve 102; i.e. the pressure of the load-sense circuit 6', begins to decrease.

Figure 7:
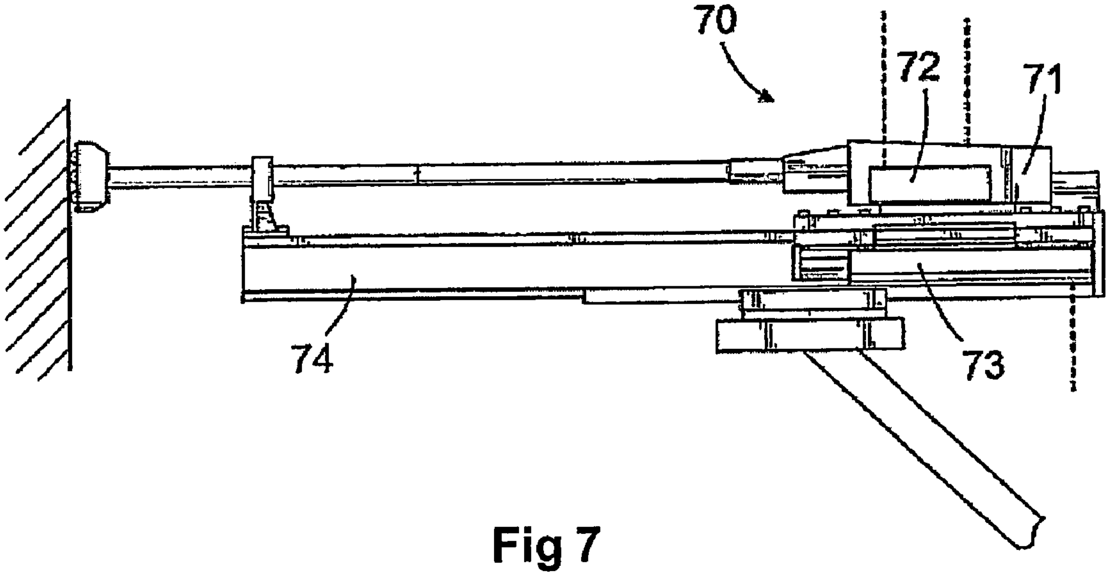
FIG. 7 is a schematic side view of a section of a rock drilling apparatus, to the control of which the solution of the invention can be applied.

FIG. 7 shows a side view of a rock drill 70. The monitoring system and monitoring valve 10 of the invention can be applied to control the hydraulic actuators of the rock drill 70. These actuators include a percussion apparatus 71 and a rotating apparatus 72. Further, one actuator of the rock drill 70 is a feed apparatus 73, by means of which the drill is moved on the feed beam 74. The feed apparatus 73 can be a hydraulic cylinder or motor, for instance.

Figure 8:
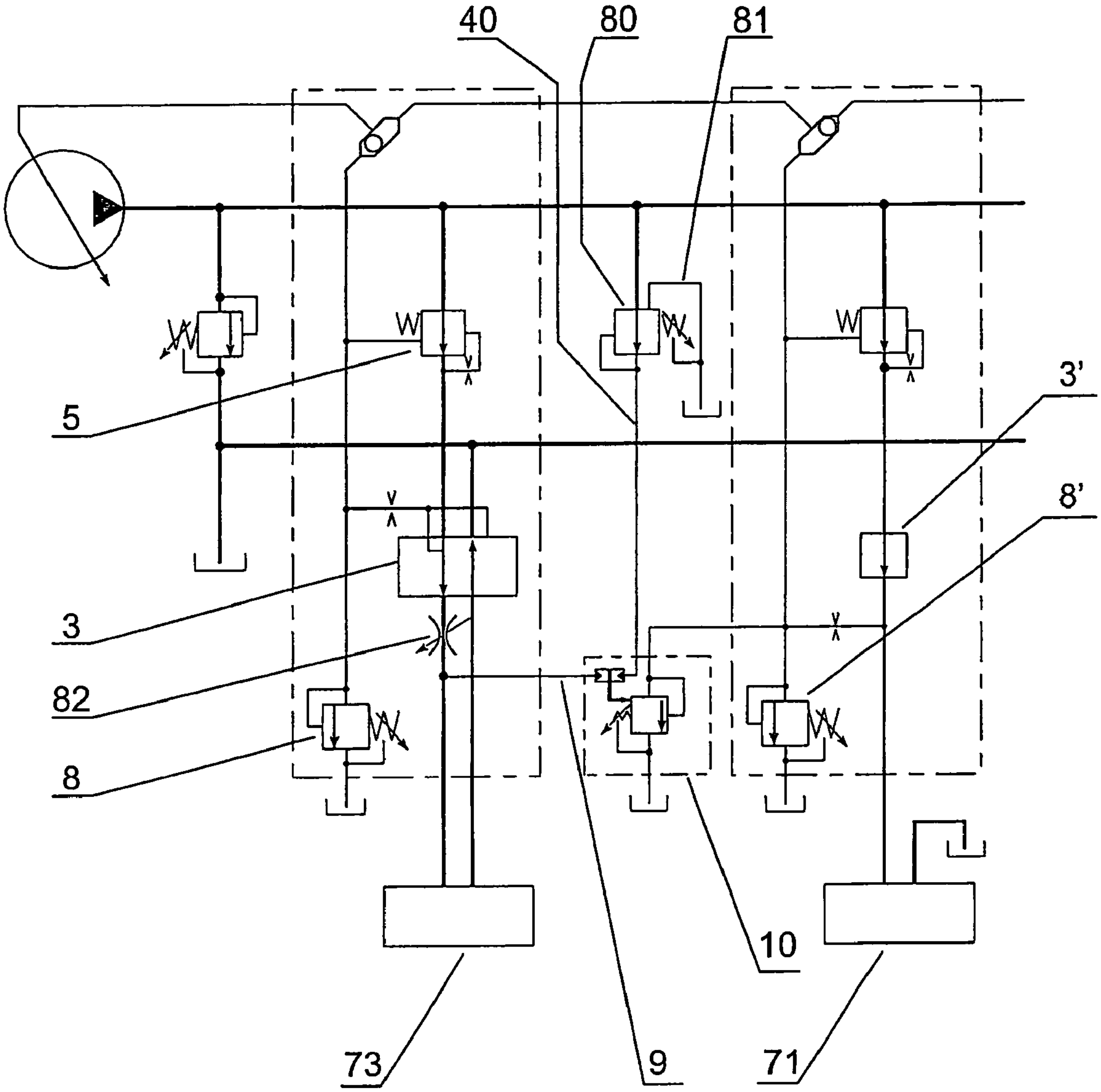
FIG. 8 is a schematic view of a hydraulic circuit of a rock drilling apparatus, to which a monitoring valve of the invention is arranged.

FIG. 8 shows a hydraulic diagram including the monitoring valve 10 to control a rock drill apparatus. This FIG. 8 is almost similar to FIG. 1, but the spool 3' with double outlet for an actuator acting in both directions is simplified into a similar spool with a single outlet suitable for the percussion apparatus 71. In the FIG. 8, the percussion apparatus is controlled via monitoring valve 10 depending on pressure in sensing channel 9 connected to the feed actuator 73. The monitoring valve is set to provide a response as per FIG. 4. The precise setting of point S is achieved by setting the reference channel 40 by any pressure device. As an example, a pressure-reducing valve 80 with additional relieving feature 81 is shown in FIG. 8. The description of valve 80 cannot be exhaustive, as any kind of pressure valve can be used, including electric actuated valves such as solenoid controlled proportional valves or servo-valves, without being out of the scope of the present invention.

In an arrangement as per FIG. 8, one only action on relief valve 8 influences directly the feed pressure, and simultaneously the percussion pressure via the monitoring valve 10.

FIG. 8 also shows an improvement. An adjustable restrictor 82 is included in the feed line between the spool 3 and feed actuator 73. The sensing channel 9 is directly connected to the feed actuator inlet, so that the monitoring valve 10 senses the precise feed pressure applied to the actuator. In this embodiment, a compensator valve 5 controlled by a relief valve 8 creates a substantially constant feed pressure, and the restrictor 82 creates a pressure drop proportional to square of the flow consumed by the feed actuator. Thus, an increasing penetration rate of the rock drill affects the drilling parameters, at first in decreasing the pressure of the feed actuator 73. As a second and simultaneous action, the monitoring valve 10 decreases the percussion pressure. As discussed above in the description, the sensing channel 9 is not subject to any flow: this specific feature ensures that no leak flow or no load-sense flow can pollute the flow from restrictor 82 to the feed actuator 73. The valve arrangement as per FIG. 8 is sensitive to penetration rate, and determines the feed pressure variation and the percussion pressure variation depending on the penetration rate.

In the arrangement shown in FIG. 8, one only action on the relief valve 8 may simultaneously increase the feed and the percussion pressures with the correct pressure ratio. However, in prior art hydraulic circuits, the two pressures had to be set separately. In the present invention, the increase of penetration rate decreases the actual feed pressure, and the percussion pressure decreases in a predetermined ratio with the feed pressure decrease.

Figure 9:
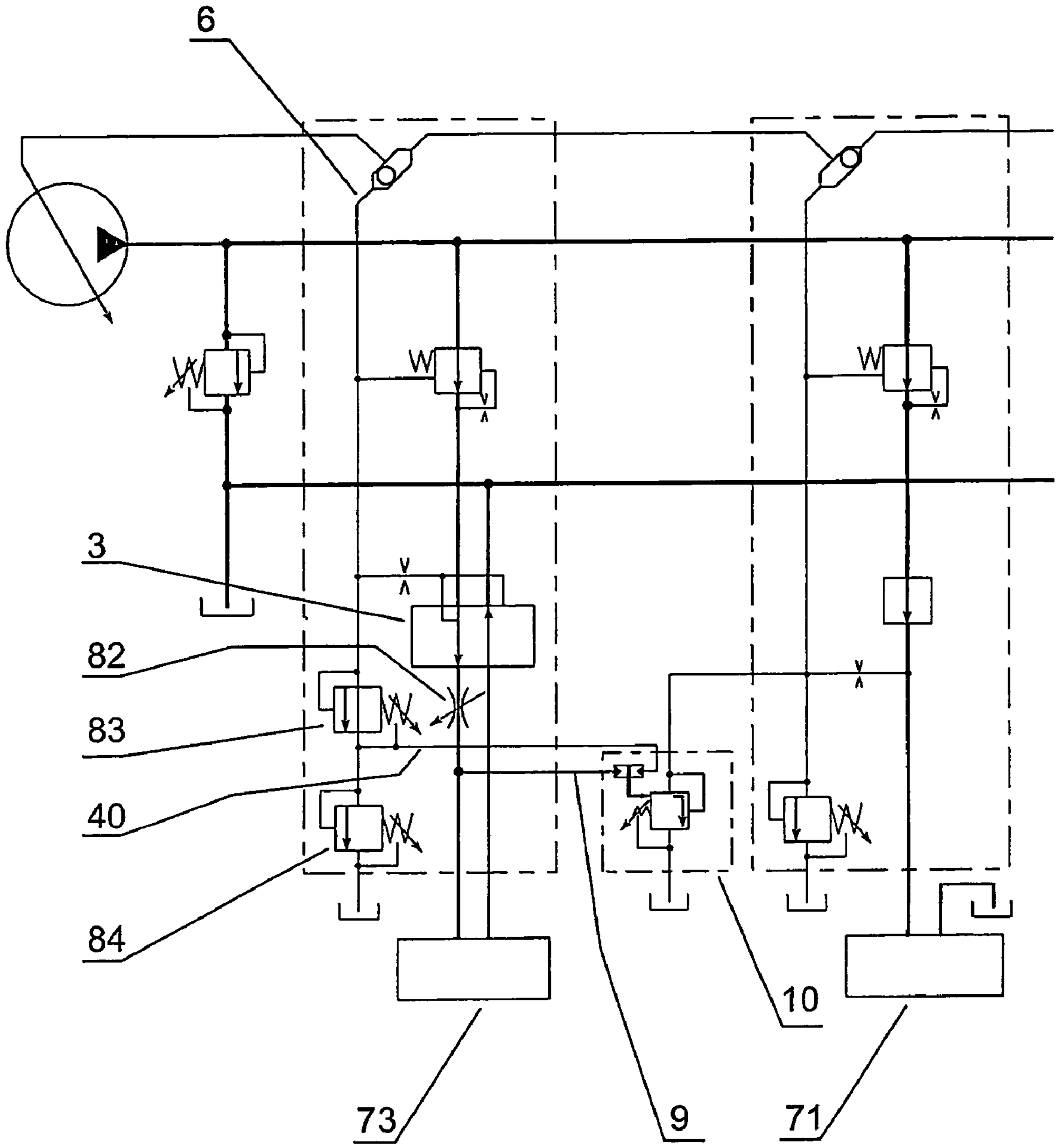
FIG. 9 is a schematic view of a hydraulic circuit of a rock drilling apparatus, with improved feed and percussion setting.

FIG. 9 shows a second improvement. The load-sense circuit 6 is connected to two relief valves 83 and 84 in series, instead of one only relief valve 8 as in FIG. 8. The reference channel 40 of the monitoring valve 10 is connected in-between the two relief valves 83 and 84. In this embodiment, one only action on the relief valve 83 simultaneously acts on the feed pressure and the percussion pressure, as explained in the description of the previous FIG. 8. Moreover in the FIG. 9 embodiment, one only action on the relief valve 83 simultaneously biases the feed pressure and the reference pressure on monitoring valve 10, thus keeping the pressure difference between the sensing line 9 and the reference line 40 at least substantially constant, and thus keeping the percussion pressure unaffected.

In the arrangement shown in FIG. 9, the operator may have a possibility to adjust the valve 84, while the percussion pressure and its according feed pressure variation are purely controlled by the penetration rate. The operator can only fine-tune the feed pressure, but the operator has no influence on the percussion pressure. On the other hand, the percussion pressure is only controlled by the penetration rate, and the sensing of the penetration rate is not affected by the possible adjustment or the fine-tuning decided by the operator on the feed pressure.

Figure 10:
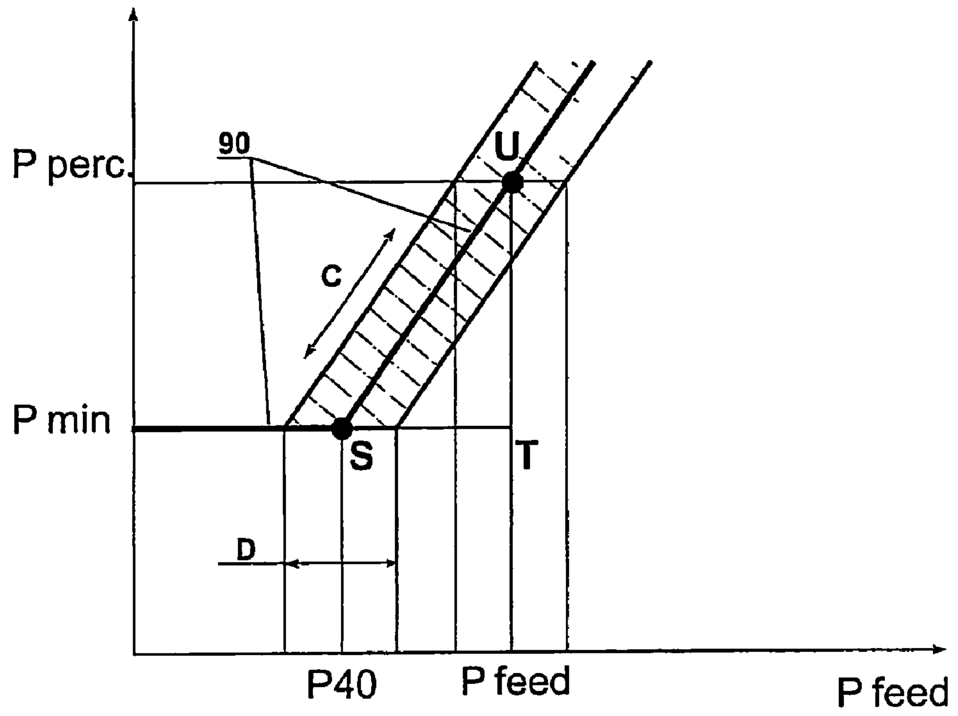
FIG. 10 is a schematic view of the effect of a monitoring valve of the invention on the control of the impact and feed pressures of a rock drill.

FIG. 10 illustrates the dual control of the feed pressure, with one only control affecting the percussion pressure. The horizontal axis shows the feed pressure and the vertical axis shows the percussion pressure. The minimum percussion pressure (min) is set with the spring 12 of the monitoring valve 10. If the feed pressure is lower than the pressure value P40 set by the relief valve 84, the percussion pressure stays constant at the minimum value. If the feed pressure is higher than the P40 threshold, any variation in the feed pressure induces a variation on the percussion pressure at a given ratio, and the oblique portion C of curve 90 shows this dependency. The oblique portion has a certain angular coefficient that corresponds to the pressure ratio of the monitoring valve 10.

FIG. 10 also illustrates that the system of the invention enables fine adjustment of the feed pressure without affecting the percussion pressure. Assuming that relief valve 83 is untouched, the triangle STU in FIG. 10 stays constant. By varying the reference pressure by the relief valve 84, the triangle STU moves back and forth along arrow D. It is very easy to understand that the feed pressure can be variable, while the percussion pressure keeps constant. This fine adjustment of the feed pressure may be required to optimise the feed force for smaller or larger bits, for hemispherical or ballistic carbide buttons, for resharpened or worn out carbide buttons, and the like.

Figure 11:
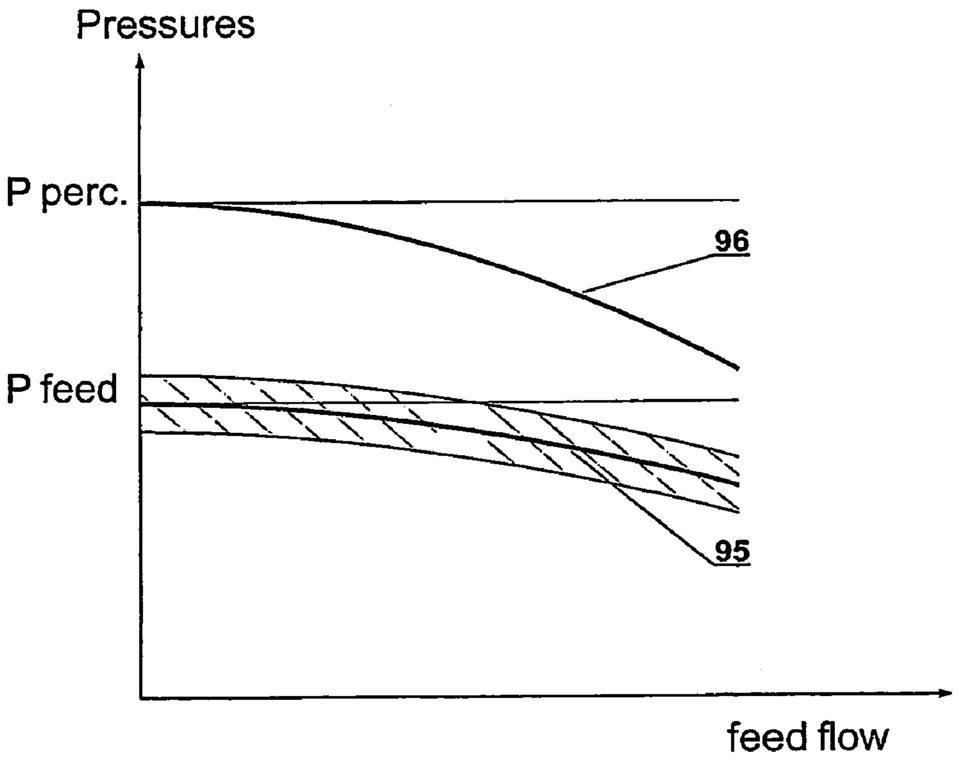
FIG. 11 is a schematic view of the effect of a system of the invention on the control of the impact and feed pressures in relation to penetration rate.

Both FIGS. 10 and 11 illustrate that the drilling system equipped with restrictor 82 between the spool 3 and the feed actuator 73 is sensitive to the penetration rate, for example when drilling through soft rock or through a cavity. When the penetration rate increases, the feed apparatus 73 requires a higher flow of pressure fluid over the restrictor 82. When the flow over the restrictor 82 increases, the pressure drop caused by the restrictor 82 increases. The feed pressure decreases according to curve 95 of FIG. 11. And the monitoring valve 10 of the invention forces the percussion pressure to decrease according to curve 96. Thus, no unnecessary stress is directed to the drill and the drilling equipment arranged to it, whatever the hardness of rock is and whatever the penetration rate is.

Figure 12:
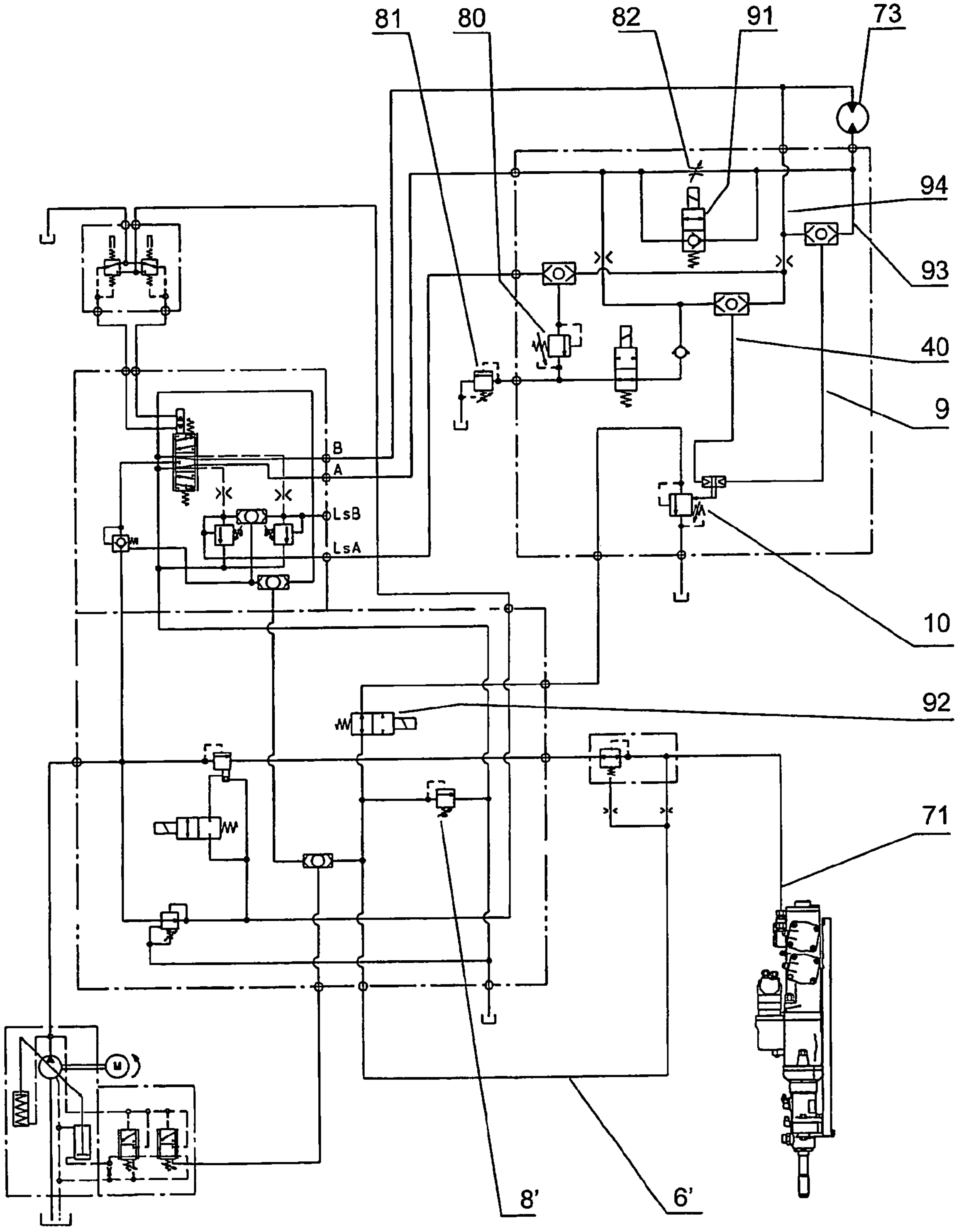
FIG. 12 is the partial hydraulic diagram of a rock drilling machine with additional features required for drilling a hole.

FIG. 12 shows a partial hydraulic schematic of the rock drill 70. It includes all the features of FIG. 9. In addition, several extra valves and restrictors create some auxiliary functions required by the complete drilling process.

At first, a solenoid valve 91 including a check-valve is connected as a by-pass to restrictor 82. The valve 91 allows fast feed retract motion, and fast feed forwards motion, for example when pulling rods.

A second improvement is the solenoid valve 92, connected in a way to enable/disable the monitoring valve 10, so that the operator can override the pressure limitations induced by the monitoring valve 10. This function is for example required to rattle the drill string loose at maximum percussion pressure, but at zero feed pressure, before retrieving the string from the drilled hole.

A third improvement is the introduction of two sensing channels 93 and 94 on both sides of the feed actuator 73, in order to activate the monitoring valve 10 in both feed directions.

A fourth possible improvement is to form the restrictor 82 as a progressive slot on a spool, in order to decrease the area of the restrictor 82 in changing the longitudinal position of the spool. The spool position may also be biased by a spring and two hydraulic pressures applied to both ends, in order to limit the restrictor area while drilling through difficult rock.

The drawings and the related description are only intended to illustrate the idea of the invention. The invention may vary in detail within the scope of the claims. Thus, it is possible to control several actuators connected to the same hydraulic circuit by using the principle of the invention of monitoring one actuator by another. Further, it is possible to apply the method, arrangement and monitoring valve of the invention to other apparatuses having at least two pressure medium-operated actuators that are controlled in relation to one another.

What is claimed is:

1. A method for controlling the operation of at least a first hydraulic actuator and a second hydraulic actuator, the method comprising:

setting with a monitoring valve the minimum or maximum pressure of the pressure medium led to the second actuator, adjusting the pressure of the pressure medium led to the second actuator in a predefined pressure ratio with the pressure led to the first actuator, and controlling a reference pressure led to the monitoring valve to define a specific pressure level of the first actuator, above which level pressure ratio control is active.

2. A monitoring valve comprising at least:

a body, an elongated slide having a first end and a second end, and arranged to a space in the body, and movable in the longitudinal direction in said space, at least one force element that is arranged to act on the first end of the slide to move the slide towards a first direction of travel, at least one controllable channel that is arranged to open and close by the longitudinal movement of the slide, and wherein the slide has at least one collar, a sleeve is arranged around the slide, the body has a space, inside which the collar and the sleeve are arranged to move, the outer rim of the sleeve is sealed to the body and the inner rim of the sleeve is sealed to the slide, the sleeve defines a first chamber and a second chamber on opposite sides of the sleeve, and said chambers are not connected to each other, the first chamber is connected at least to a first pressure channel, the second chamber is connected at least to a second pressure channel, the sleeve is arranged to move in the first or the second direction of travel depending on the pressure difference inside the chambers, and in one direction of travel, the sleeve is arranged to act on the axial position of the slide when abutting on the collar.

3. A monitoring valve as claimed in claim 2, wherein the sleeve is arranged to abut on the collar, on the same side as the force element, the first chamber is on the force element side of the sleeve and the second chamber is on the collar side of the sleeve, the first chamber is connected to a sensing channel, the second chamber is connected to a reference channel, and the sleeve is arranged to push via the collar the slide towards the first direction of travel, if the pressure of the sensing channel is higher than that of the reference channel.

4. A monitoring valve as claimed in claim 2, wherein the sleeve is arranged to abut on the collar, on the opposite side of the collar with respect to the force element, the first chamber is on the force elemental side of the sleeve and the second chamber is on the on the opposite side of the sleeve, the first chamber is connected to a reference channel, the second chamber is connected to a sensing channel, and the sleeve is arranged to push via the collar the slide towards the second direction of travel, if the pressure of the sensing channel is higher than that of the reference channel.

5. A monitoring valve as claimed in claim 2, wherein the force element is a spring and the pushing force of the spring is adjustable.

6. A monitoring valve as claimed in claim 2, wherein the second end of the slide is arranged tightly to a bore in the body, the pressure of the controllable channel is arranged to act on the end surface of the second end of the slide, the bore is connected to at least one transverse discharge channel, and the second end of the slide is arranged to open and close the connection between the controllable channel and discharge channel.

7. A monitoring valve as claimed in claim 2, wherein the monitoring valve is arranged to adjust the pressure variation of the controllable channel in a predefined ratio with the pressure variation of the sensing channel, and the pressure ratio of the monitoring valve is determined by the ratio of the end surface area of the sleeve to the cross-surface area of the second end of the slide.

8. A monitoring valve as claimed in claim 2, wherein the sleeve is arranged to abut on the collar, on the same side as the force element, the first chamber is on the force element side of the sleeve and the second chamber is on the collar side of the sleeve, the first chamber is connected to a sensing channel, the second chamber is connected to a reference channel, the sleeve is arranged to push via the collar the slide towards the first direction of travel, if the pressure of the sensing channel is higher than that of the reference channel, and the action of the sleeve is arranged to increase the pressure of the controllable channel at a given ratio, when the sleeve abuts on the collar of sleeve on the same side as the force element.

9. A monitoring valve as claimed in claim 2, wherein the sleeve is arranged to abut on the collar, on the opposite side of the collar with respect to the force element, the first chamber is on the force element side of the sleeve and the second chamber is on the on the opposite side of the sleeve, the first chamber is connected to a reference channel, the second chamber is connected to a sensing channel, the sleeve is arranged to push via the collar the slide towards the second direction of travel, if the pressure of the sensing channel is higher than that of the reference channel, and the action of the sleeve is arranged to decrease the pressure of the controllable channel at a given ratio, when the sleeve abuts on the collar of sleeve on the opposite side of the force element.

10. A rock drilling apparatus comprising:

a percussion apparatus, a feed apparatus, a hydraulic system, to which the percussion apparatus and feed apparatus are connected, and at least one hydraulic pump for supplying hydraulic pressure to the hydraulic system, at least one compensator valve in the pressure medium channel leading to the percussion apparatus, and at least one second compensator valve in the pressure medium channel leading to the feed apparatus for adjusting the operation of the percussion apparatus and feed apparatus, respectively, at least one monitoring valve for setting the minimum pressure of the pressure medium led to the percussion apparatus and for adjusting the pressure of the pressure medium led to the percussion apparatus in a predefined pressure ratio with the pressure led to the feed apparatus, and wherein a reference pressure channel is connected to the monitoring valve and the control of the pressure in the channel is arranged to provide a specific pressure level of the feed apparatus, above which level the feed pressure activates the pressure ratio control on the percussion apparatus.

11. A rock drilling apparatus as claimed in claim 10, wherein the pressure of the feed apparatus is determined by setting in the load-sense circuit of the feed apparatus a first relief valve and a second relief valve mounted respectively in the direction of the load-sense flow, the reference channel of the monitoring valve is connected in-between the first relief valve and the second relief valve, the first relief valve acts on the feed pressure and the percussion pressure in a predefined pressure ratio, and the second relief valve acts on the feed pressure only.

12. A rock drilling apparatus as claimed in claim 10, wherein the rock drilling apparatus comprises at least one restrictor sensitive to the actual flow of the feed apparatus, the restrictor is arranged in the feed circuit to the feed apparatus and induce feed pressure variation depending on the penetration rate, the feed pressure variation simultaneously biases the monitoring valve to control with pressure ratio the pressure variation on the percussion apparatus.

13. A rock drilling apparatus as claimed in claim 10, wherein the rock drilling apparatus comprises at least one restrictor sensitive to the actual flow of the feed apparatus, the restrictor is arranged in the feed circuit to the feed apparatus and induce feed pressure variation depending on the penetration rate, the feed pressure variation simultaneously biases the monitoring valve to control with pressure ratio the pressure variation on the percussion apparatus, and the restrictor of the feed apparatus is formed on a spool biased by a spring and hydraulic pressures on both ends, so that the restrictor area may be hydraulically controlled and be progressively restricted from its initial preset value down to a zero area, for drilling in difficult rock.

14. A rock drilling apparatus comprising:

a percussion apparatus, a feed apparatus, a hydraulic system, to which the percussion apparatus and feed apparatus are connected, and at least one hydraulic pump for supplying hydraulic pressure to the hydraulic system, at least one compensator valve in the pressure medium channel leading to the feed apparatus for adjusting the operation of the feed apparatus, at least one monitoring valve for setting the minimum pressure of the pressure medium led to the percussion apparatus and for adjusting the pressure variation of the pressure medium led to the percussion apparatus in a predefined pressure ratio with the pressure variation of the feed apparatus, and wherein a reference pressure channel is connected to the monitoring valve and the control of the pressure in the channel is arranged to provide a specific pressure level of the feed apparatus, above which level the feed pressure activates the pressure ratio control on the percussion apparatus.

15. A rock drilling apparatus as claimed in claim 14, wherein the pressure of the feed apparatus is determined by setting in the load-sense circuit of the feed apparatus a first relief valve and a second relief valve mounted respectively in the direction of the load-sense flow, the reference channel of the monitoring valve is connected in-between the first relief valve and the second relief valve, the first relief valve acts on the feed pressure and the percussion pressure in a predefined pressure ratio, and the second relief valve acts on the feed pressure only.

16. A rock drilling apparatus as claimed in claim 14, wherein the rock drilling apparatus comprises at least one restrictor sensitive to the actual flow of the feed apparatus, the restrictor is arranged in the feed circuit to the feed apparatus and induce feed pressure variation depending on the penetration rate, and the feed pressure variation simultaneously biases the monitoring valve to control with pressure ratio the pressure variation on the percussion apparatus.

17. A rock drilling apparatus as claimed in claim 14, wherein the rock drilling apparatus comprises at least one restrictor sensitive to the actual flow of the feed apparatus, the restrictor is arranged in the feed circuit to the feed apparatus and induce feed pressure variation depending on the penetration rate, the feed pressure variation simultaneously biases the monitoring valve to control with pressure ratio the pressure variation on the percussion apparatus, and the restrictor of the feed apparatus is formed on a spool biased by a spring and hydraulic pressures on both ends, so that the restrictor area may be hydraulically controlled and be progressively restricted from its initial preset value down to a zero area, for drilling in difficult rock.

* * * * *